US012194734B2

(12) United States Patent
Bicego et al.

(10) Patent No.: US 12,194,734 B2
(45) Date of Patent: Jan. 14, 2025

(54) PRINTING MACHINE

(71) Applicant: UTECO CONVERTING S.P.A., Colognola ai Colli (IT)

(72) Inventors: Alessandro Bicego, San Giovanni Lupatoto (IT); Agostino Pertile, San Martino Buon Albergo (IT)

(73) Assignee: UTECO CONVERTING S.P.A., Colognola Ai Colli (IT)

( * ) Notice: Subject to any disclaimer, the term of this patent is extended or adjusted under 35 U.S.C. 154(b) by 103 days.

(21) Appl. No.: 17/954,851

(22) Filed: Sep. 28, 2022

(65) Prior Publication Data

US 2023/0102009 A1 Mar. 30, 2023

(30) Foreign Application Priority Data

Sep. 28, 2021 (IT) ........................ 102021000024722

(51) Int. Cl.
*B41J 11/04* (2006.01)
*B41J 3/54* (2006.01)
(Continued)

(52) U.S. Cl.
CPC ............... *B41J 11/04* (2013.01); *B41J 3/546* (2013.01); *B41F 5/24* (2013.01); *B41F 19/007* (2013.01); *B41J 2025/008* (2013.01)

(58) Field of Classification Search
CPC ...... B41J 11/04; B41J 3/546; B41J 2025/008; B41F 5/24; B41F 19/007
See application file for complete search history.

(56) References Cited

U.S. PATENT DOCUMENTS 5,526,748 A 6/1996 Schleinz et al.
2008/0271622 A1 11/2008 Ronecker et al.
(Continued)

FOREIGN PATENT DOCUMENTS

CN 111775559 A 10/2020
JP 2017-530026 A 10/2017
(Continued)

OTHER PUBLICATIONS

Japanese Notice of Reasons for Refusal dated May 31, 2024 received in Japanese Patent Application No. 2022-153823, together with an English-language translation.
(Continued)

*Primary Examiner* — Justin Seo
(74) *Attorney, Agent, or Firm* — Scully, Scott, Murphy & Presser, P.C.

(57) ABSTRACT

A printing machine comprising advancement elements for advancing material in sheet form to be printed which are provided at least with a traction drum which is designed to receive, at an entry region, the material in sheet form to be printed and to convey it toward an exit region spaced circumferentially apart, along the direction of rotation of the traction drum about its own axis, from the entry region; analog print stations are arranged around the traction drum, between the entry region and the exit region and, between at least two analog print stations, conveyance means are provided for conveying the material in sheet form to be printed which arrives from the traction drum along an advancement path that has at least one advancement portion for advancing the material in sheet form to be printed which extends substantially straight, along which at least one digital print station is arranged.

17 Claims, 3 Drawing Sheets

(51) Int. Cl.

| | |
|---|---|
| *B41F 5/24* | (2006.01) |
| *B41F 19/00* | (2006.01) |
| *B41J 25/00* | (2006.01) |

(56) References Cited

U.S. PATENT DOCUMENTS

| | | | | |
|---|---|---|---|---|
| 2015/0290926 | A1 | 10/2015 | Branca et al. | |
| 2020/0371456 | A1* | 11/2020 | Landa | B41J 2/01 |
| 2021/0276345 | A1 | 9/2021 | Praet et al. | |

FOREIGN PATENT DOCUMENTS

| | | | |
|---|---|---|---|
| WO | 2009/079572 | A1 | 6/2009 |
| WO | 2011104845 | A1 | 9/2011 |
| WO | 2017207590 | A1 | 12/2017 |
| WO | 2021/110912 | A1 | 6/2021 |

OTHER PUBLICATIONS

Italian Search Report and Written Opinion dated May 13, 2022 issued in IT 202100024722, with partial translation.

European Third Party Observation dated Jul. 2, 2024 for European Application No. 20220197855.

* cited by examiner

PRINTING MACHINE

The present invention relates to a printing machine.

Printing machines are known which are based on different printing techniques.

In particular, analog printing machines are known which are based on the flexographic printing technique, which involves the use of flexible typographic relief plates to execute the printing on a print substrate in sheet form.

Depending on the arrangement of the print units, flexographic printing machines can be of the central drum type, in which the print units are distributed around a single large printing roller, or of the "stack" type, in which the print units are arranged one above the other, or of the in-line type, in which the print units are distributed horizontally along a printing line.

Another type of analog printing machine is based on the rotogravure printing technique, which consists of directly transferring the inks onto different types of print substrates. In machines of this type the print units are, typically, arranged in a line.

Machines are also known which are based on inkjet digital print technology, which makes it possible to print directly on a print substrate using digital inkjet print heads arranged along a horizontal line.

In recent years progressively greater interest has been shown in digital print technology by companies in the product packaging sector, as this technology, unlike analog print techniques, makes it possible to produce small print runs economically and with greater flexibility, and it features lower costs for storing and disposing of materials with respect to production based on analog print techniques only.

Notwithstanding these advantages, digital printing machines have some drawbacks, which include problems with registration of colors with stretchable substrates, such as for example substrates made of LDPE, and also during the travel of the substrate, low quality of solids, presence of stitching defects, difficulties in fixing colors, high costs of ownership, low productivity, and missing nozzles.

In order to combine the advantages of the various different technologies available, hybrid printing machines have also been conceived in the attempt to obtain better print quality, a reduction in energy consumption and a reduction in waste, and to ensure the repeatability of print quality over time.

Such hybrid machines have, along the advancement path of the material in sheet form to be printed, both analog print stations and digital print stations.

In the current configuration of hybrid machines, the material has to travel several meters between the various print stations, with the consequent risk that deviations and variations in tension of the material in sheet form to be printed may occur. These factors make the manipulation of the material very complex and they lead to increasing errors in print registration.

Difficulties in print registration result in the operator taking a long time to execute all the necessary measurements to obtain the best possible print quality. A high number of print tests translates to a great quantity of wasted material.

Currently, combining the various print stations leads hybrid printing machines to have a structure that extends considerably lengthwise and as a consequence takes up an extremely large area.

Also with a view to combining advantageous characteristics of different technologies, digital printing machines have been proposed which are fitted with a central drum for entraining the material in sheet form to be printed, around which the inkjet digital print stations are distributed.

These machines too have been found not entirely satisfactory, in that the print quality of such machines has been found to be lower than that of traditional digital machines.

Furthermore, these machines have unfavorable running costs, low quality of print coverage, stitching defects, limitations in the color gamut, weak ability for drying, with consequent limits on printing speeds.

The aim of the present invention is to provide a printing machine that is capable of improving the known art in one or more of the above mentioned aspects.

Within this aim, an object of the invention is to provide a printing machine that is capable of combining high print quality with the advantages of digital printing.

Another object of the invention is to provide a printing machine that offers excellent control of print registration.

Another object of the present invention is to provide a printing machine that presents a smaller space occupation than the hybrid printing machines known at present.

Another object of the invention is to provide a printing machine that makes it possible to reduce waste with respect to other, known machines.

Another object of the invention is to provide a printing machine that is flexible, enabling the production of printed designs of different types.

Another object of the invention is to provide a printing machine that is capable of printing on a wide range of mutually different print substrates.

Another object of the invention is to provide a printing machine that does not have a stitching impact on print coverage.

Another object of the invention is to provide a printing machine that has a color gamut that comprises all colors.

Another object of the invention is to provide a printing machine that enables an easy control of solid colors.

Another object of the invention is to develop a printing machine that is capable of offering better running costs than the existing technologies.

Another object of the invention is to provide a printing machine that is capable of achieving greater efficiency in the drying of inks with respect to the known art.

Another object of the invention is to provide a printing machine that is capable of printing optimally even on stretchable substrates, such as those made of LDPE.

Another object of the invention is to provide a printing machine that makes it possible to achieve print registration within a few meters of length of the substrate to be printed on.

Another object of the invention is to provide a printing machine that is capable of operating at higher speeds with respect to the known art.

Another object of the invention is to provide a printing machine that, owing to its technical peculiarities, is capable of opening up new market segments.

A further object of the present invention is to overcome the drawbacks of the background art in a manner that is alternative to any existing solutions.

Another object of the invention is to provide a printing machine that is highly reliable, relatively easily implemented and can be produced at low cost.

This aim and these and other objects which will become better apparent hereinafter are achieved by a printing machine according to claim 1, optionally provided with one or more of the characteristics of the dependent claims.

Further characteristics and advantages of the invention will become better apparent from the description of preferred, but not exclusive, embodiments of the printing machine according to the invention, which are illustrated for the purposes of non-limiting example in the accompanying drawings wherein.

Figure 1:
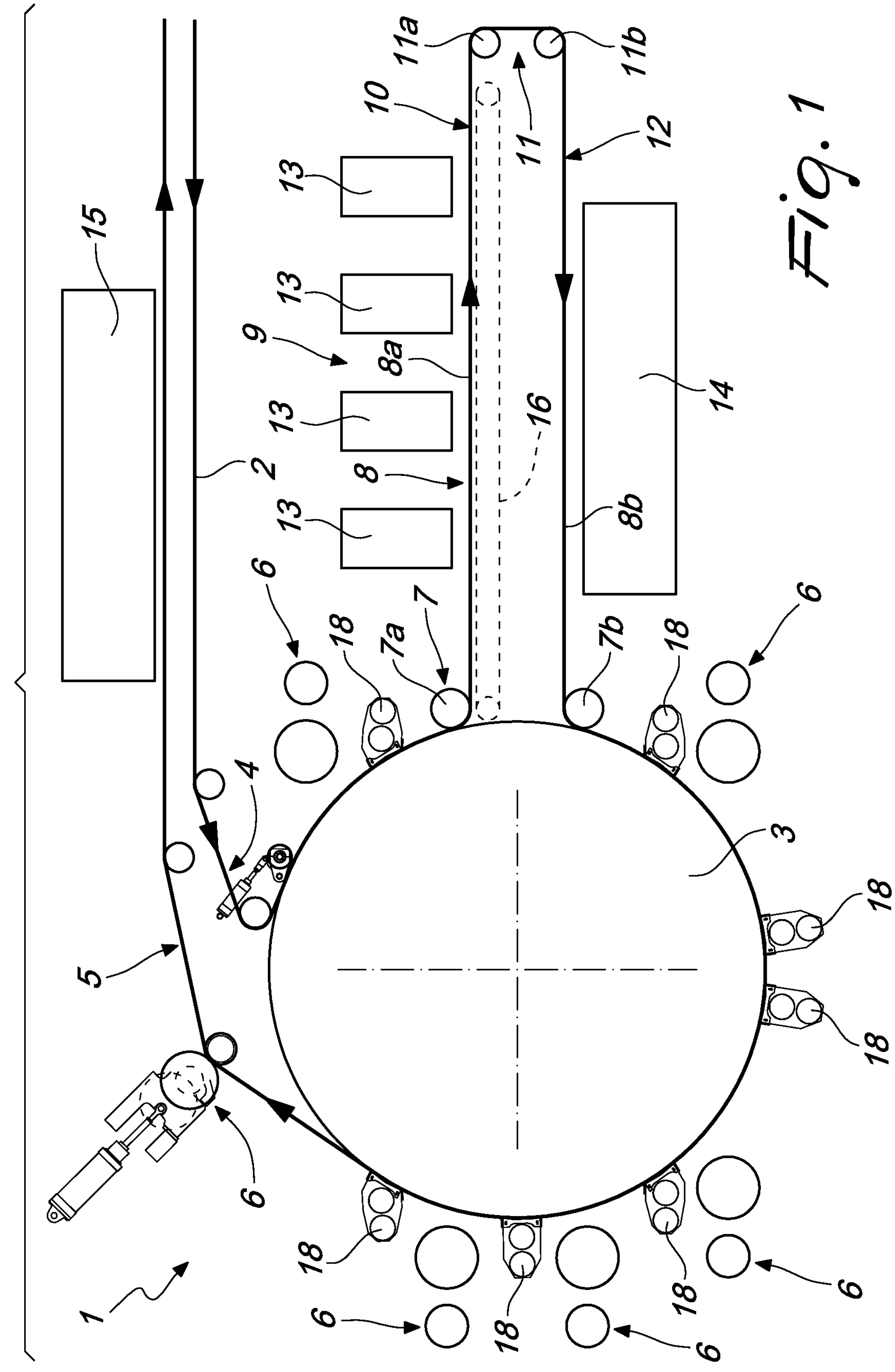
FIG. 1 is a schematic side view of a printing machine according to the invention.

With reference to the figures, the printing machine according to the invention, generally designated by the reference numeral 1, comprises, on a supporting frame, advancement means for advancing material in sheet form 2 to be printed, formed by a continuous belt, which are provided with at least one traction drum 3, which can rotate about its own axis.

In particular, the traction drum 3 is designed to receive, at an entry region 4, the material in sheet form 2 to be printed and to convey it toward an exit region 5, which is arranged circumferentially spaced apart from the entry region 4 along the direction of rotation of the traction drum 3 about its own axis, and at which the material in sheet form 2 finally leaves the traction drum 3.

Analog print stations 6 are arranged around the traction drum 3, between the entry region 4 and the exit region 5.

The peculiarity of the invention consists in that it comprises, between at least two of the analog print stations 6, conveyance means 7 for conveying the material in sheet form 2 to be printed which arrives from the traction drum 3 along an advancement path that has at least one advancement portion 8 for moving forward the material in sheet form 2 to be printed which extends substantially straight.

Also according to the invention, at least one digital print station 9 is arranged along such advancement portion 8.

This solution makes it possible to position the digital print station 9 in an appendage of the advancement means for advancing or moving forward the material in sheet form, which extends outside the traction drum 3 so that the digital print station can operate on a substantially straight advancement portion 8, with consequent advantages in terms of print quality, and between two analog print stations 6 which by contrast are arranged along the peripheral region of the same traction drum, with the consequent advantage of ensuring an optimal print registration.

In more detail, the conveyance means 7 define, for the advancement path of the material in sheet form 2 that such means provide, at least one outward leg 10, which extends from the traction drum 3 to at least one redirection assembly 11 for redirecting the material in sheet form 2 to be printed, which is located in a position laterally spaced apart with respect to the traction drum 3, and at least one inward leg 12, which, in turn, extends from the redirection assembly 11 to the traction drum 3.

Preferably, the advancement portion 8 is defined along the at least one outward leg 10 and extends, advantageously, along a substantially horizontal direction.

As illustrated, the conveyance means 7 can, for example, comprise at least one redirection roller 7*a*, which makes it possible to redirect the material in sheet form 2 which arrives from the traction drum 3 in order to convey it along the outward leg 10 defined by said conveyance means, and then send it to the digital print station 9.

Figure 3:
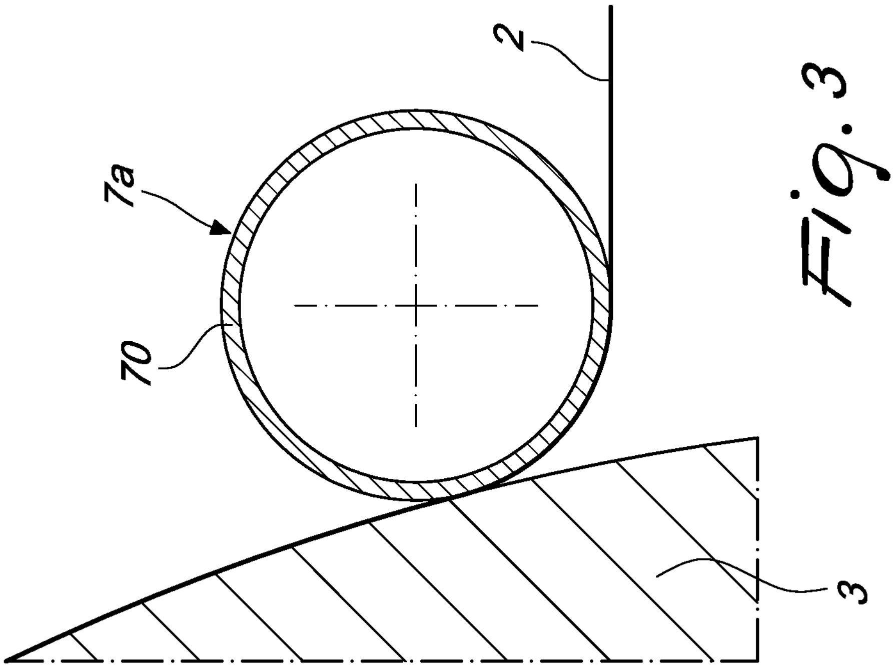
FIG. 3 is a partially cross-sectional side view of a detail of the machine according to the invention.

As shown in particular in FIG. 3, the redirection roller 7*a* can be covered externally by a layer 70 that does not adhere to the material in sheet form 2, which can be made, for example, of the material commercially known under the TEFLON trademark or another, similar material.

Figure 4:
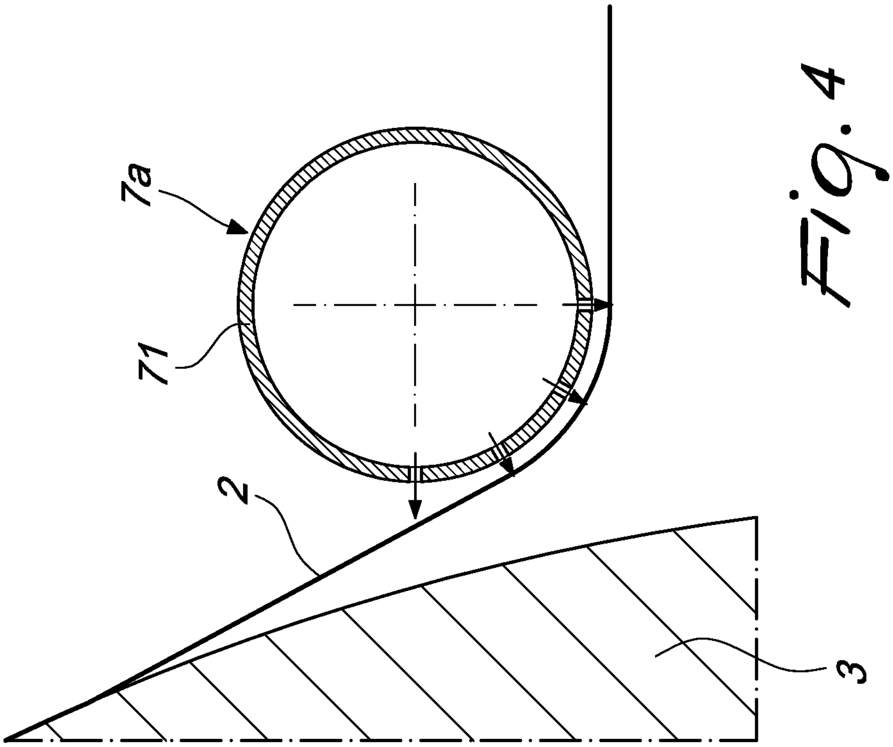
FIG. 4 shows a variation of embodiment of the detail of FIG. 3.

Alternatively, as shown in FIG. 4, the redirection roller 7*a* can also be provided by an air blower bar 71, constituted by a hollow cylinder, axially fed with air under pressure and provided with a perforated side wall for the outflow of the air, so as to create a gap between the outer surface of the redirection roller 7*a* and the material in sheet form 2.

Figure 2:
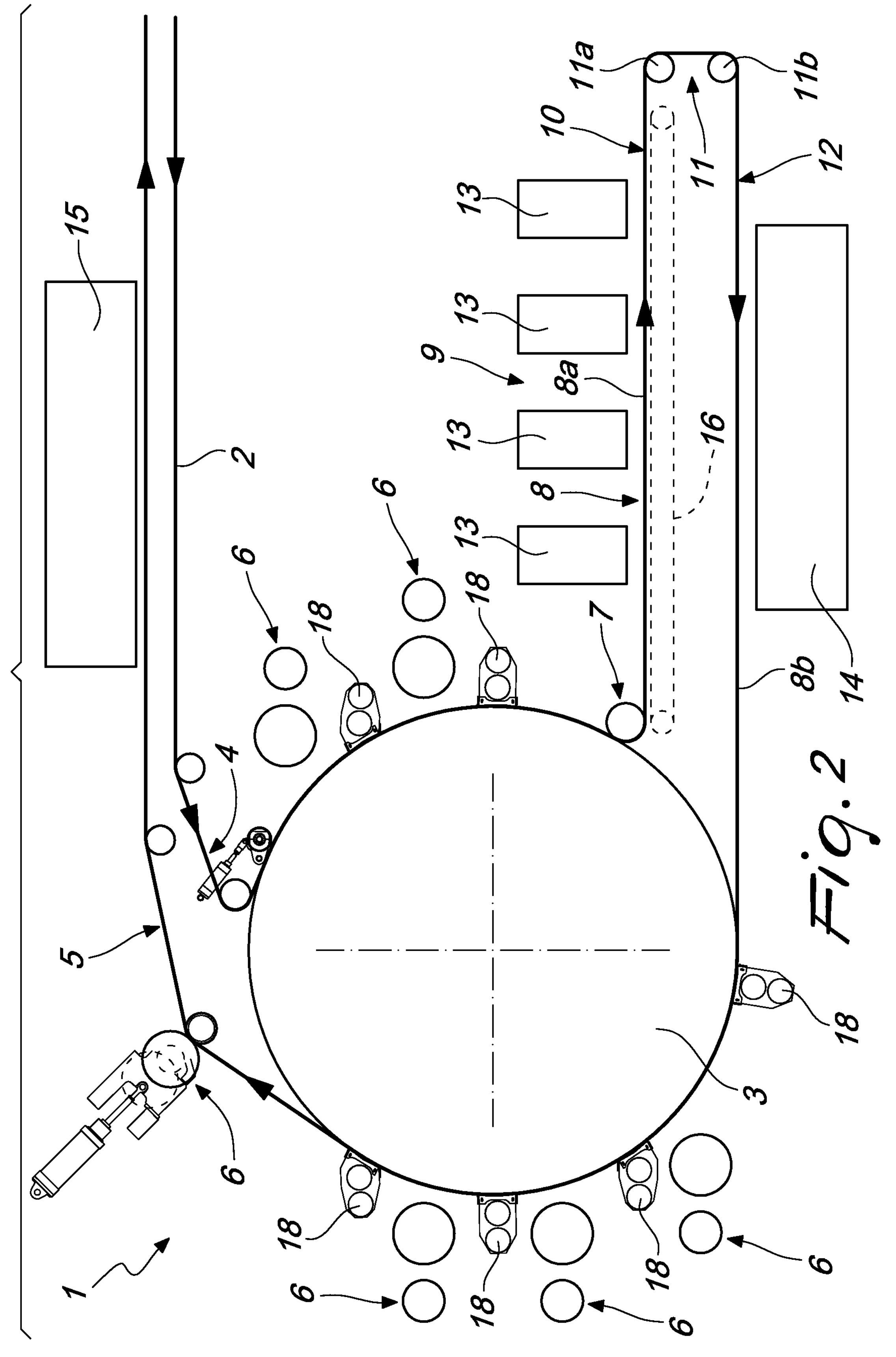
FIG. 2 is a schematic side view of a possible variation of embodiment of the machine according to the invention.

Optionally, as in the example of FIG. 2, the conveyance means 7 can also comprise a bend roller 7*b* which accompanies the material in sheet form 2 arriving from the inward leg 12 of the conveyance means, so it adheres once again to the outer surface of the traction drum 3.

Advantageously, the redirection assembly 11 can be provided by one or more redirection rollers 11*a*, 11*b* which take the material in sheet form 2 and convey it from the outward leg 10 to the inward leg 12.

Conveniently, the digital print station 9 comprises, along the advancement portion 8, one or more digital inkjet print heads 13 which are arranged facing an upward-facing face of the material in sheet form 2 to be printed and are mutually laterally adjacent along the advancement direction of the material in sheet form 2.

Optionally, it is possible to have, at least along the advancement portion 8, a vacuum mat 16 on which the material in sheet form 2 rests, which makes it possible to prevent unwanted displacements of the material in sheet form 2 during the application of the inks by the digital print station 9.

Conveniently, along the advancement path defined by the conveyance means 7, there can be, downstream of the digital print station 9, at least one first drying station or station 14 for the initial drying of the inks, which is constituted, for example, by a drying tunnel.

Preferably, the first drying station 14 is arranged along the inward leg 12 of the conveyance means 7 which returns the material to be printed 2 to the transfer drum 3.

More preferably, according to the embodiments illustrated, along the outward leg 10 defined by the conveyance means 7 there is at least one first advancement portion 8*a* which extends substantially straight and, along the inward leg 12, there is at least one second advancement portion 8*b* which extends substantially straight. In this case, the digital print station 9 is conveniently arranged along the above mentioned first advancement portion 8*a* and the first drying station 14 is arranged along the second advancement portion 8*b*.

It should be noted that both upstream and downstream of the conveyance means 7, with respect to the direction of rotation of the traction drum 3 about its own axis, there can be one or more analog print stations 6.

Conveniently, the analog print stations 6 arranged about the traction drum 3 can comprise at least one flexographic print station and/or at least one rotogravure print station and/or at least one print station of the "offset" type.

Advantageously, the rotogravure print station can, for example, be arranged directly upstream of the exit region 5 of the material in sheet form 2 from the traction drum 3, preferably providing, thereat, for the separation of the material in sheet form 2 to be printed from the traction drum 3, in order to allow the passage of the material in sheet form 2 between the cylinders of the rotogravure print station, as shown in FIGS. 1 and 2.

Advantageously, the analog print stations 6 can further comprise at least one station for applying at least one layer for the pretreatment of the material in sheet form to be printed, which is arranged upstream of the conveyance means 7 along the direction of rotation of the traction drum 3 about its rotation axis. For example, such pretreatment layer can be a primer or a coating adapted to improve the adhesion of the inks that will be applied on the material in sheet form 2 by the digital print station and/or by the subsequent analog print stations 6.

It should be noted that the inks used in the analog print stations 6 and in the digital print station 9 can be of the water-based, biological, or solventless type.

Advantageously, along the advancement means of the material in sheet form 2, preferably downstream of the exit region 5 of the material in sheet form 2 from the transfer drum 3, there can be at least one second drying station or station 15 for the final drying of the inks, which can also be provided by a drying tunnel.

It must be noted that, around the traction drum 3 and downstream of each analog print station 6, preferably between one analog print station 6 and the subsequent analog print station, in the direction of rotation of the traction drum 3, there can optionally be at least one respective hood 18 for drying the inks. It should be noted that at least one drying hood 18 can also be provided downstream of the conveyance means 7.

The operation of the printing machine, according to the invention, is the following.

The material in sheet form 2 to be printed is fed by the advancement means to the traction drum 3 through the entry region 4 and proceeds, while adhering to the outer surface of the transfer drum 3, passing through at least one analog print station 6, which can conveniently apply at least one layer of pretreatment on the material in sheet form 2 that is transiting on the transfer drum 3 or execute, in general, an analog print, such as for example a flexographic print or a rotogravure print.

Subsequently, the material in sheet form 2 is picked up from the transfer drum 3 by the conveyance means 7, by way of the redirection roller 7*a*, so as to be conveyed along the outward leg 10 of the advancement path defined by the conveyance means 7 in order to be sent to the digital print station 9 arranged outside the transfer drum 3.

In particular, by proceeding along the outward leg 10, the material in sheet form 2 travels the first advancement portion 8*a*, passing through the digital print station 9, where it is subjected to a digital printing process.

Once it has exited from the digital print station 9, the material in sheet form 2 arrives at the redirection assembly 11 which conducts it toward the inward leg 12, where it travels the second advancement portion 8*b*, passing through the first drying station 14, which makes it possible to execute an initial drying of the inks applied on the material in sheet form to be printed.

Downstream of the drying station 14, the material in sheet form 2 then reaches the traction drum 3 once again, so as to continue its advancement, while adhering to the outer surface of the traction drum 3.

At this point, proceeding in its advancement on the traction drum 3, the material in sheet form 2 passes through the analog print stations 6, located downstream of the conveyance means 7, which each apply inks of a respective color on the material in sheet form 2.

Once it reaches the exit region 5, the material in sheet form 2 is finally removed from the traction drum 3 to be sent to the second drying station 15 which carries out the final drying of the inks applied on the material in sheet form 2 during its advancement from the entry region 4 to the exit region 5 of the traction drum 3.

In practice it has been found that the invention fully achieves the intended aim and objects by providing a printing machine that is very compact, with respect to traditional hybrid printing machines, by virtue of the presence of the traction drum, and capable of ensuring an optimal quality of digital printing, by virtue of the presence of the conveyance means interposed between the entry region and the exit region of the material in sheet form onto and off the traction drum, which make it possible to execute the digital print on a substantially straight advancement portion of the material in sheet form.

Another advantage of the invention is that it ensures an optimal print registration, with respect to conventional hybrid machines, thanks to the presence of analog print stations arranged in sequence about the traction drum.

Also, the advantage of having analog print stations downstream of the digital print station is that of being able to apply layers of inks or paints or adhesives (cold seal, heat seal and the like) of great thickness at high speed, something that is much more difficult to do using digital technology, in which the inks or paints or adhesives need to be applied with very low viscosity and very long drying ovens are needed in order to reach the same speeds enabled by the invention.

Another advantage of having analog print stations downstream of the digital print station is the uniformity and colorimetry of solid colors, since they can be printed with analog technology in a single print station, unlike digital technology which uses multiple heads to superimpose multiple colors in order to achieve a spot color, with consequent reduction in the times and costs of color matching.

The invention, thus conceived, is susceptible of numerous modifications and variations, all of which are within the scope of the appended claims.

Thus for example, the digital print station 9 can, alternatively, be implemented with devices using toner or using stream inkjet technology.

It must further be noted that, if EB/UV inks are used, the drying station or stations will be adapted to carry out the polymerization of the inks using the emission of electron beams or UV rays, depending on the type of ink.

In practice, the materials used, as well as the contingent shapes and dimensions, may be any according to the requirements and to the state of the art.

The disclosures in Italian Patent Application No. 102021000024722 from which this application claims priority are incorporated herein by reference.

What is claimed is:

1. A printing machine comprising advancement means for advancing material in sheet form to be printed which are provided with at least a traction drum which can rotate about an axis thereof and is designed to receive, at an entry region, the material in sheet form to be printed and to convey it toward an exit region for the exit of the material in sheet form from said traction drum, said exit region being spaced circumferentially apart, along the direction of rotation of said traction drum about its own axis, from said entry region, analog print stations being arranged around said traction drum, between said entry region and said exit region, wherein the printing machine further comprises, sequentially between at least two of said analog print stations, in the material advancing sequence, conveyance means for conveying the material in sheet form to be printed which arrives from said traction drum along an advancement path that has at least one advancement portion for advancing the material in sheet form to be printed which extends substantially straight, at least one digital print station being arranged along said at least one advancement portion.

2. The printing machine according to claim 1, wherein said conveyance means define, for said advancement path, at least one outward leg, which extends from said traction drum to at least one redirection assembly for redirecting the material in sheet form to be printed, and at least one inward leg, which extends from said redirection assembly to said traction drum.

3. The printing machine according to claim 1, wherein said at least one advancement portion, extending substantially straight, is defined along said at least one outward leg.

4. The printing machine according to claim 1, wherein said at least one advancement portion, extending substantially straight, extends along a substantially horizontal direction.

5. The printing machine according to claim 1, wherein said digital print station comprises, along said at least one advancement portion, at least one inkjet digital print head which faces an upward-facing face of said material in sheet form to be printed.

6. The printing machine according to claim 1, further comprising, along said advancement path, downstream of said at least one digital print station, at least one first drying station.

7. The printing machine according to claim 6, wherein said at least one first drying station is arranged along said at least one inward leg.

8. The printing machine according to claim 2, wherein along said at least one outward leg there is at least one first advancement portion which extends substantially straight and along said at least one inward leg there is at least one second advancement portion which extends substantially straight, said at least one digital print station being arranged along said at least one first advancement portion, said at least one first drying station being arranged along said at least one second advancement portion.

9. The printing machine according to claim 1, wherein said analog print stations comprise at least one flexographic print station.

10. The printing machine according to claim 1, wherein said analog print stations comprise at least one rotogravure print station.

11. The printing machine according to claim 1, wherein said analog print stations comprise at least one offset print station.

12. The printing machine according to claim 1, wherein said analog print stations comprise at least one station for applying at least one layer for pretreatment of the material in sheet form to be printed, which is arranged upstream of said conveyance means along the direction of rotation of said traction drum about its rotation axis.

13. The printing machine according to claim 6, further comprising at least one second drying station which is arranged along said advancement means, downstream of said exit region.

14. A printing process, comprising in sequence the steps of: feeding a material in sheet form to be printed to a traction drum through an entry region; advancing the material in sheet form adhering to an outer surface of said traction drum; performing at least one analog print on the material in sheet form to be printed adhering to said traction drum; diverting the material in sheet form to be printed from said traction drum in order to convey it along an advancement path which has at least one advancement portion extending substantially straight; performing at least one digital print on the material in sheet form to be printed, while it travels along said at least one substantially straight advancement portion; returning the material in sheet form to be printed to adhere to an outer surface of said traction drum; advancing the material in sheet form to be printed adhering to said traction drum; performing at least one analog print on the material in sheet form to be printed adhering to said traction drum; picking up the printed material in sheet form from said traction drum through an exit region.

15. The printing process according to claim 14, wherein the step of performing at least one analog print, performed before the step of redirecting the material in sheet form from said traction drum, comprises the application of at least one pretreatment layer on the material in sheet form to be printed.

16. The printing process according to claim 14, further comprising at least one step of initial drying of the inks after the step of performing at least one digital print and before the step of returning the material in sheet form to be printed to adhere to the outer surface of said traction drum.

17. The printing process according to claim 14, further comprising at least one step of final drying of the inks, after the step of picking up the material in sheet form from said traction drum through said exit region.

* * * * *